US007734576B2

(12) United States Patent
Simon et al.

(10) Patent No.: US 7,734,576 B2
(45) Date of Patent: Jun. 8, 2010

(54) APPARATUS AND METHOD FOR RELATING GRAPHICAL REPRESENTATIONS OF DATA TABLES

(75) Inventors: Eric Simon, Juvisy (FR); Dinial Bensalah, Courbevoie (FR); Steve Kopp, Paris (FR); Ioan-Lucian Precup, Versailles (FR)

(73) Assignee: Business Objects Software Ltd., Dublin (IE)

(*) Notice: Subject to any disclaimer, the term of this patent is extended or adjusted under 35 U.S.C. 154(b) by 433 days.

(21) Appl. No.: 11/742,506

(22) Filed: Apr. 30, 2007

(65) Prior Publication Data

US 2007/0274154 A1 Nov. 29, 2007

Related U.S. Application Data

(60) Provisional application No. 60/797,184, filed on May 2, 2006.

(51) Int. Cl.
*G06F 7/00* (2006.01)
*G06F 17/00* (2006.01)

(52) U.S. Cl. .................................................... 707/602

(58) Field of Classification Search ................. 707/100, 707/102
See application file for complete search history.

(56) References Cited

U.S. PATENT DOCUMENTS

| 5,937,417 | A | * | 8/1999 | Nielsen ....................... 715/207 |
| 6,175,837 | B1 | * | 1/2001 | Sharma et al. ........... 707/103 Y |
| 6,640,221 | B1 | * | 10/2003 | Levine et al. .................. 707/3 |

* cited by examiner

*Primary Examiner*—Hung Q Pham
*Assistant Examiner*—Jeffrey Burke
(74) *Attorney, Agent, or Firm*—Cooley Godward Kronish LLP

(57) ABSTRACT

A computer readable storage medium includes executable instructions to receive a selection of two or more data source tables from one or more data sources, determine a data source table that defines keys, and receive mapping information that defines one or more column relationships between the data source table and a second data source table. Relationship structures between the data source tables are analyzed. The data source tables and the relationship structures are graphically represented in a sequential order where the order in which the data source tables are depicted is based on a depth of a relationship between the data source table that defines keys and a second data source table.

20 Claims, 17 Drawing Sheets

APPARATUS AND METHOD FOR RELATING GRAPHICAL REPRESENTATIONS OF DATA TABLES

CROSS REFERENCE TO RELATED APPLICATIONS

This application claims the benefit of U.S. Provisional Application Ser. No. 60/797,184, entitled "Apparatus and Method for Relating Graphical Representations of Data Tables," filed May 2, 2006, the contents of which are hereby incorporated by reference in their entirety.

BRIEF DESCRIPTION OF THE INVENTION

This invention relates generally to graphical representations of data. More particularly, this invention relates to graphical representations of related data tables and the dynamic ordering of the tables to enable a user to visualize the relationships between the tables.

BACKGROUND OF THE INVENTION

Enterprise Information Management (EIM) refers to the processes and tools for managing and consolidating data. Data is often found in either data sources that lack the desired structure or data consistency or in multiple data sources with different structures and data consistency standards. To create a reliable version of this data, the data can be extracted, transformed, and loaded into either a physical or virtual target data source. The transform process may provide mapping logic or more complex logic to modify the data before it is consolidated. This target data source can then be used for BI, reporting, or other purposes.

The process of migrating data from a source (e.g., a database) to a target (e.g., another database, a data store, a data mart or a data warehouse) is sometimes referred to as Extract, Transform and Load, or the acronym ETL. ETL is a specific data transformation process. Extracting refers to the process of reading the data from a source (e.g., a database). Transforming is the process of converting the extracted data from its previous form into the form it needs to be in and cleansing it so that it can be placed in the target (e.g., a new database, data mart, or data warehouse). Transformation may include rules or lookup tables or combining the data with other data. Loading is the process of writing the data into the target.

The process of migrating from a source to a "virtual" data warehouse is sometimes referred to as EII (Enterprise Information Integration). EII is the process of selecting and combining data from multiple systems "real time", without storing it on a disk enabling "on the fly" transformation in order to create a "virtual" data warehouse.

In the cases of both ETL and EII, it can be difficult for a user designing mappings to visualize the relationships between the data sources that supply the data to the target data warehouse or target virtual data warehouse.

Current technologies for visualizing these data operations tend to focus on data flow and transformation of the data within this process rather than on the specific relationships between the data sources. In a situation where multiple data sources supply the data for a target, the relationships between the data sources are not clearly illustrated through GUI (Graphical User Interface) displays. Although the data sources that are combined and the transforms applied to them may be displayed, it is generally not possible to determine the relationship, or absence of relationships, between data sources, in particular when there are multiple data sources.

When data sources are combined at different levels/stages in the processing of the source data to construct the target data, it is not possible to easily view the relationships between data sources in prior art visualizations.

Often the tree structure of related data sources makes it difficult to determine dependencies without visual indicators of broken links. Prior art approaches also make it difficult to assess the depth of the links.

In view of the foregoing, it would be desirable to provide improved techniques for relating graphical representations of data tables.

SUMMARY OF THE INVENTION

The invention includes a computer readable storage medium with executable instructions to receive a selection of two or more data source tables from one or more data sources, determine a data source table that defines keys, and receive mapping information that defines one or more column relationships between the data source table and a second data source table. Relationship structures between the data source tables are analyzed. The data source tables and the relationship structures are graphically represented in a sequential order where the order in which the data source tables are depicted is based on a depth of a relationship between the data source table that defines keys and a second data source table.

The invention also includes a computer readable storage medium with executable instructions to receive a selection of two or more data source tables from one or more data sources, determine a data source table that defines keys, and receive information about relationship links between the data source tables. The data source tables are analyzed to determine a deepest relationship link from a selected data source table to the other data source tables. A graphical representation of the data source tables and their relationships is generated, where the graphical representations is ordered based on the links of the deepest relationship.

The invention also includes a computer readable storage medium with executable instructions to receive a selection of a data source table from one or more data sources, map the data source table to a target table, and graphically represent the data source table. One or more definitions of a relationship between the data source table and a second data source table are received. The relationship between the data source table and the second data source table is graphically represented.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
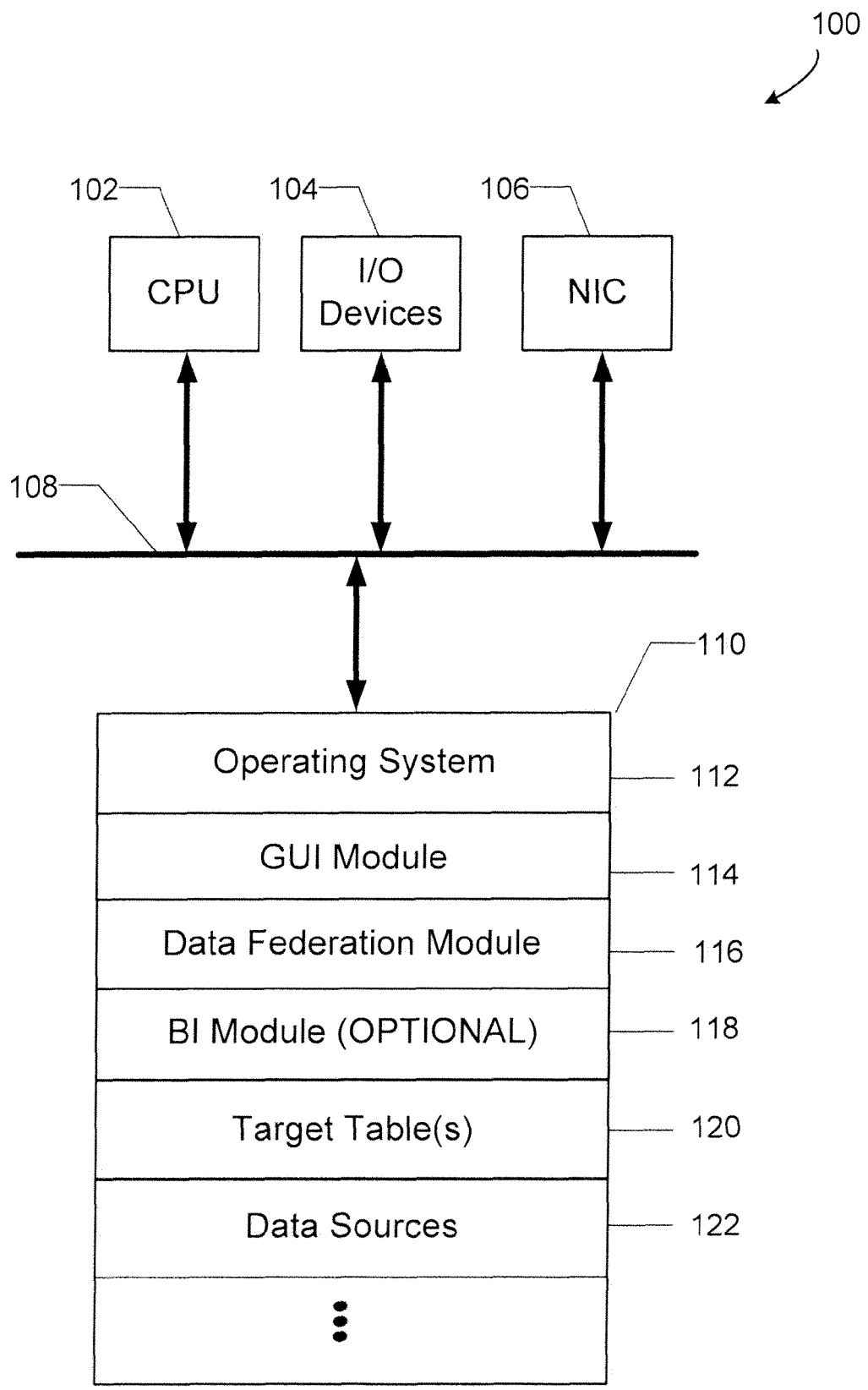
FIG. 1 illustrates a computer configured in accordance with an embodiment of the invention.

The following terminology is used while disclosing embodiments of the invention:

A data source is a source of data. Data sources include sources of data that enable data storage and retrieval. Data sources include databases, such as, relational, transactional, hierarchical, multidimensional (e.g., OLAP), object oriented databases, and the like. Further data sources include tabular data (e.g. spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like. Data sources also include data that is not stored like data streams, broadcast data, and the like.

A data source table is a structured set of data from a data source. A data source table includes a database table, structured file, or the like where the data content is logically structured. The data may be logically structured in tables with columns and rows where each row represents a data record. A data source table is used in whole or in part to define the data content of a target table by mapping all or a portion of the data content of the data source table to the target table using a data federation program.

A target table is a table that is constructed based on other data sources. Data can be mapped to or transformed and loaded to populate the target table. The data content of the target table is determined based on the data content of one or more source data tables which are mapped to the target table using a data federation program. Typically, the structure of a target table is pre-defined or is specified by the user.

A data mapping rule is a group of one or more column mapping formulas that describe a way to compute the data content of one or more rows in one target data table from a set of rows composed from at least one data source table. A mapping rule typically specifies one or more data source tables, one or more column mapping formulas, one or more relationships between data source tables and may optionally comprise one or more data source filters.

A core data source table is a data source table that comprises one or more columns, the data content of which is used in a column mapping formula to define a key column of one data target table, or a data source table that establishes a relationship between two core data source tables.

A non-core data source table is a data source table used to define the data content of a data target table which is not a core data source table.

A column mapping formula is a formula that describes how to calculate a column value in a row of a data target table using data values taken from one or more rows or columns in a data source table. Mapping formulas can specify a range of logic to apply when mapping source values to the target table. Typically, a column in a data source table is mapped to a column in the data target table. Column mapping formulas typically comprise functional expressions, case statements (such as a list of if/then case formulas), or combinations or aggregations thereof.

A data source table relationship, or a relationship, defines how to link data from one table with data from another table. Links join a data column from one data source table to one or more columns from another data source table to form a composite data row in one data target table. Source table relationships are typically expressed as an equality predicate between the related columns of the two data source tables. Relationships between two core data source tables are typically interpreted as joins between the tables. Relationships between a core data source table and a non-core data source table are typically interpreted as a left-outer join from the core table towards the non-core table.

A data filter is a logical condition applied to determine the inclusion or exclusion of data values. A data filter applies logical conditions to determine the selection and in some cases modification of data values. A data filter can be applied to evaluate which values are included as data values in a target table. The data filter may be applied against the data in the data source table before a column mapping formula.

FIG. 1 illustrates a computer 100 configured in accordance with an embodiment of the invention. The computer 100 includes standard components, including a central processing unit 102 and input/output devices 104, which are linked by a bus 108. The input/output devices 104 may include a keyboard, mouse, touch screen, monitor, printer, and the like. A network interface circuit 106 is also connected to the bus 108. The network interface circuit (NIC) 108 provides connectivity to a network (not shown), thereby allowing the computer 100 to operate in a networked environment. A data storage repository (not shown) may also be connected to the network, and in one embodiment, may thereby be connected to the computer 100 through the NIC 106.

A memory 110 is also connected to the bus 108. The memory 110 stores executable instructions to implement operations of the invention. In one embodiment, the executable instructions may include one or more of the following modules: an operating system module 112, a graphical user interface (GUI) module 114, a data federation module 116, and an optional business intelligence (BI) module 118.

The operating system module 112 may include instructions for handling various system services, such as file services or for performing hardware dependant tasks. The GUI module 114 may rely upon standard techniques to produce graphical components of a user interface, e.g., windows, icons, buttons, menus and the like, examples of which are discussed below. The user interface may include instructions to receive input from a pointer device and display a cursor on an output device. The data federation module 116 includes executable instructions for mapping data from one or more data source tables from one or more source databases to a target table. In conjunction with the GUI module 114, the data federation module 116 contains instructions for displaying graphical representations of relationships between data source tables. Source databases may optionally be stored in a data storage repository (not shown) as described above. The optional BI module 118 may include executable instructions to perform Business Intelligence (BI) related functions, such as, generate reports, access databases, perform queries and analyses, and the like. In an embodiment of the invention which includes the optional BI module 118, the data federation module 116 may be incorporated in the BI module 118 as a sub-module. Memory 110 also includes target table(s) 120, which may be created using Data Federation Module 116, through user input, or through an automated process, or provided through another mechanism. Data source(s) 122 include relational databases, structured files, and the like. In typical embodiments of the invention, data sources may be distributed across a network.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2A:
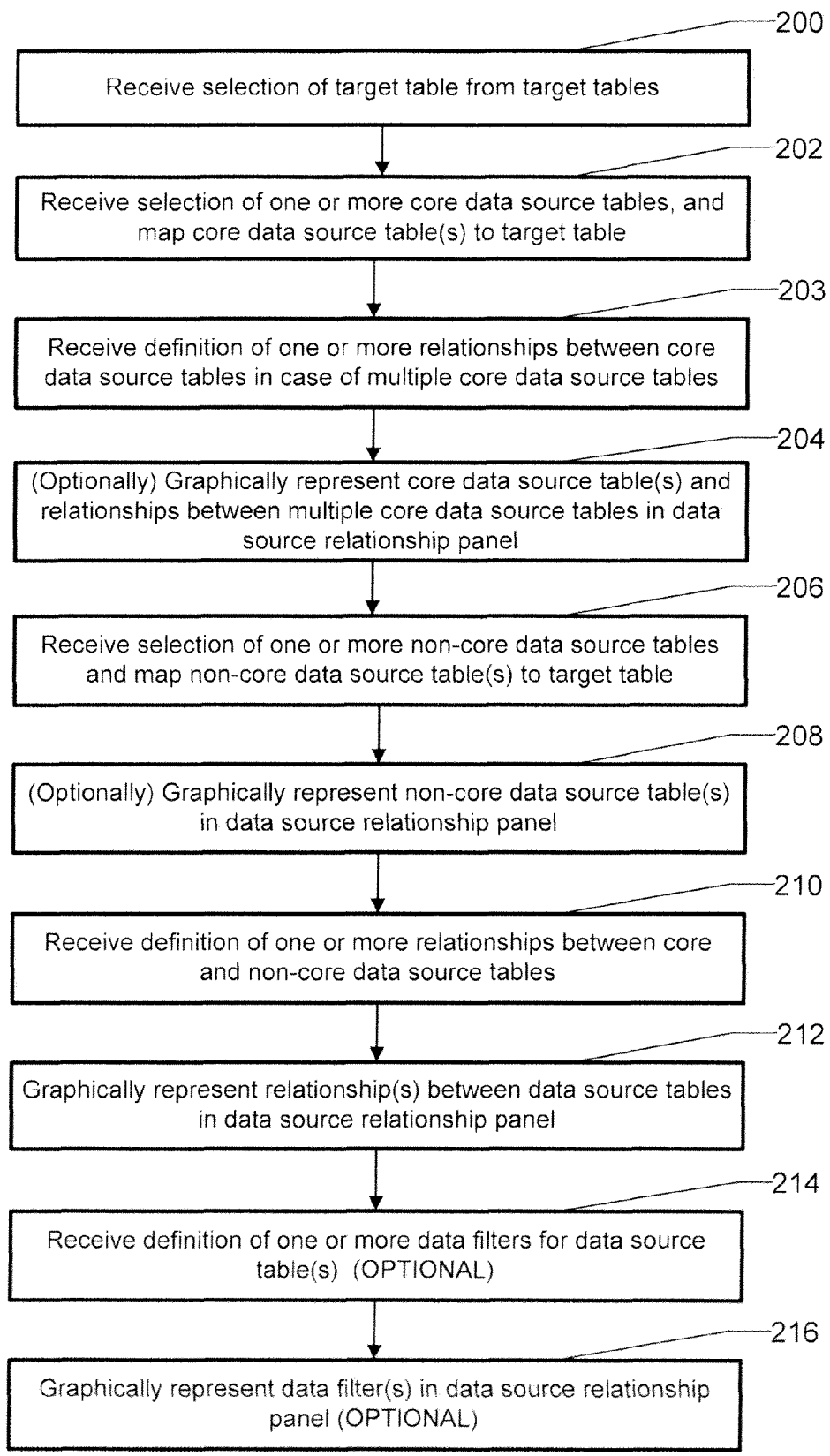
FIG. 2A illustrates a series of processing operations associated with an embodiment of the invention.

FIG. 2 illustrates processing operations that may be implemented by the executable instructions of the data federation module 116 on the computer 100 according to an embodiment of the invention. The first processing operation of FIG. 2A is to accept selection of a target table from a set of one or more target tables 200. Selection may be defined by a user or may be via automated means.

The next operation of FIG. 2A is to receive a selection of one or more core data source tables, and map core data source tables to the target table 202. In one embodiment, the mapping of core data source tables to the target table received in operation 202 may comprise the definition of a data mapping rule comprising definitions of one or more column mapping formulas that describe a way to compute the data content of one or more rows in the selected data target table based on one or more rows of each selected core data source table.

The next operation of FIG. 2A is to receive a definition of one or more relationships between core data source tables in the case of multiple selected core data source tables 203. Therefore, if two or more core data source tables have been selected in operation 202, operation 203 comprises receiving the definition of a relationship definition comprising an equality predicate for each pair of selected core data source tables.

The next operation of FIG. 2A is to optionally graphically represent selected core data source tables and relationships between multiple core data source tables in a data source relationship panel 204. The data source relationship panel is typically presented in a GUI, as is described in several exemplary embodiments below. In one embodiment of the invention, each selected core data source table, and each relationship between core data source tables (if there are multiple selected core data source tables selected) may be graphically represented individually in the data source relationship panel of the GUI. Further, each relationship between core data source tables may be graphically represented so that it may be visually associated with the two core data source tables between which the relationship describes a relation. In one embodiment of the invention, the graphical representation of the core data sources and relationships occurs in a general GUI rendering of graphical relationship(s) between data source tables in a data source relationship panel 212.

The next operation of FIG. 2A is to receive selection of one or more non-core data source tables and map non-core data source tables to the data target table 206. In an embodiment employing a data mapping rule, as described above in operation 202, the mapping of non-core data source tables to the data target table received in operation 206 may comprise the addition of one or more column mapping formulas for each non-core data source table to the data mapping rule.

The next operation of FIG. 2A is to optionally graphically represent selected non-core data source tables in a data source relationship panel 208. In one embodiment of the invention, each selected non-core data source table may be graphically represented individually in the data source relationship panel. In one embodiment of the invention, the graphical representation of the core data sources and relationships occurs in a general GUI rendering of graphical relationship(s) between data source tables in a data source relationship panel 212.

The next operation of FIG. 2A is to receive a definition of one or more relationships between selected core and non-core data source tables 210. In an embodiment comprising multiple selected non-core data source tables that are related to each other, a relationship may be defined between two related non-core data source tables. In an embodiment, each selected non-core data source table may have a relationship comprising an equality predicate defined between the non-core data source table, and a core data source table, either directly, or through one or more other non-core tables which may be related to a core table. In one embodiment, the appearance of the graphical representation of a non-core data source table in a data source relationship panel provides information about the relationship of the non-core data source to one or more core data source tables, so that the graphical representation of a non-core table that has a defined relationship with a core table (either directly, or through one or more other non-core tables which are related to a core table) appears distinct from the graphical representation of a non-core table that does not have a defined relationship with a core table.

The next operation of FIG. 2A is to graphically represent relationships between selected core and non-core data source tables in the data source relationship panel 212. In one embodiment of the invention, each relationship between data source tables may preferably be graphically represented individually in the data source relationship panel. Further, each relationship between data source tables may be graphically represented so that it is visually associated with the two data source tables between which the relationship describes a relation.

The next optional operation of FIG. 2A is to receive a definition of one or more data filters for selected data source tables 214. In one embodiment of the invention, each definition of a data filter may comprise a logical condition statement.

The next optional operation of FIG. 2A is to graphically represent data filters in the data source relationship panel 216. In one embodiment of the invention, each data filter may be graphically represented in the data source relationship panel individually, and in a manner so that it is visually associated with the data source table to which it is logically connected.

In a particular embodiment of the invention, aspects of several steps of the processing operations of FIG. 2A may be conducted by a user. In particular, the selected data target table and data source tables in operations 200, 202, and 206 may be selected by a user. In a user-oriented embodiment, the user may select a target table or a data source table from a list or directory of available data tables in a GUI displayed on a computer output device such as a display, which may be represented by a user-navigable tree for example. As an example, the user may select the target table or a data source table by clicking on a representation of the table in a GUI displayed on a computer output device using an input device such as a mouse or a keyboard, or may use an input device to drag a representation of the table from one location in a GUI to another, such as from one window or panel to another, as another example.

Similarly, in a user-oriented embodiment, the mapping of data source tables and definition of relationships between data sources of operations 202, 203, 206 and 210 may be conducted by a user. In one example, a data mapping rule is defined by the user by specifying one or more column mapping formulas for each core data source table. In another example, the user may define relationships between data source tables by specifying an equality predicate for each pair of related data source tables. In a similar manner, a user may define a data filter in optional operation 214 by specifying a logical condition definition for the filter.

Figure 2B:
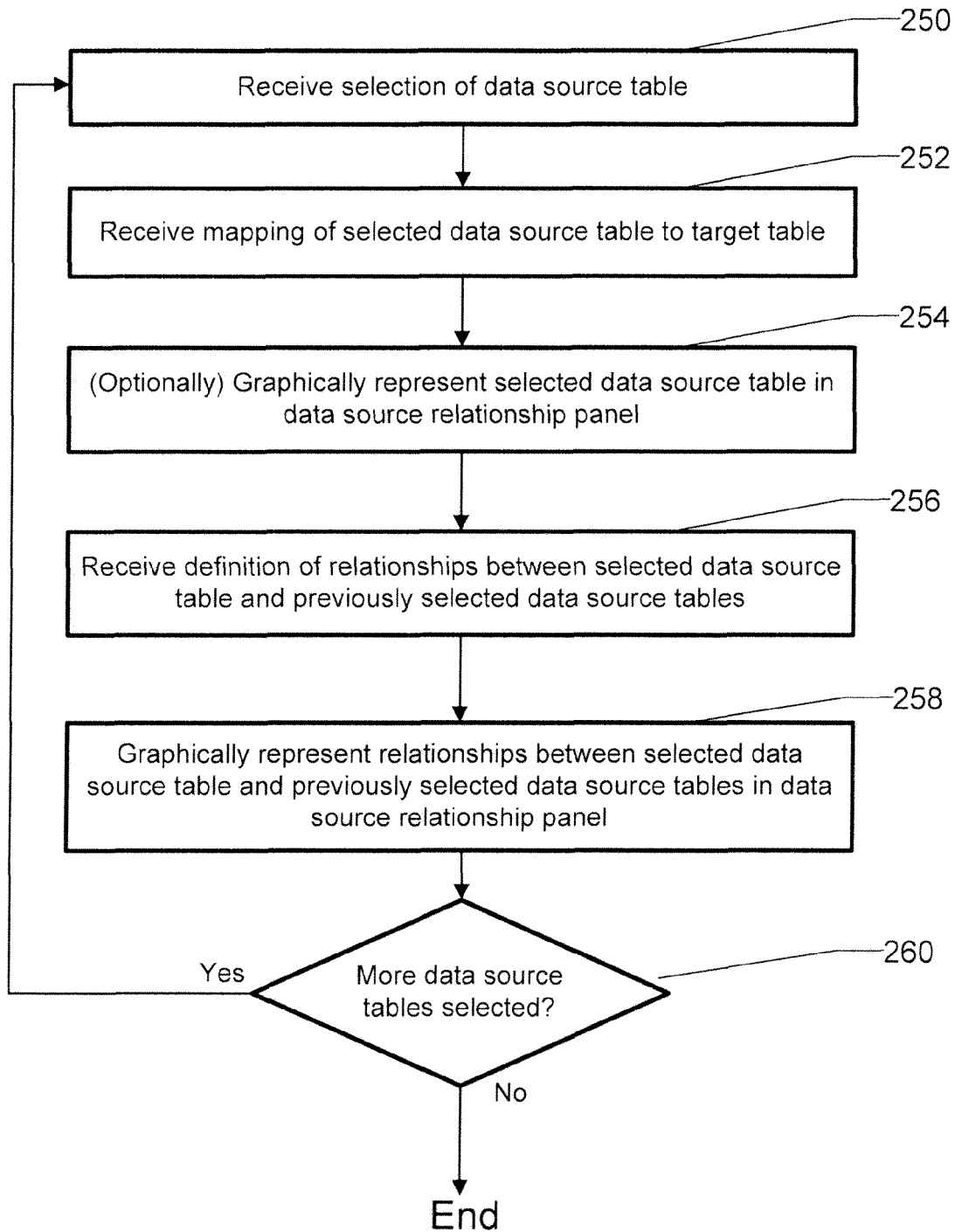
FIG. 2B illustrates a series of processing operations associated with a further embodiment of the invention.

FIG. 2A illustrates processing operations that may be implemented by the executable instructions of the data federation module 116 on the computer 100 according to an embodiment of the invention. Typically, the processing operations of FIG. 2B are implemented following the selection of a suitable target table from a set of one or more target tables. The set of target tables may be defined in another process, such as by a user, or by automatic means, and may be stored in the memory 110 of computer 100, or elsewhere on a computer network connected to computer 100.

The first operation of FIG. 2B is to receive a selection of a data source table 250. The data source table may be a core data source table or a non-core data source table.

The next operation of FIG. 2B is to receive a mapping of the data source table to a selected target table 252. In one embodiment, the mapping of the data source table to the target table accepted in this operation may comprise the definition of a data mapping rule comprising definitions of one or more column mapping formulas that describe a way to compute the data content of one or more rows in the selected target table based on one or more rows of the selected data source table.

The next operation of FIG. 2B is to optionally graphically represent the selected data source table in a data source relationship panel 254. The data source relationship panel is typically presented in a GUI, as is described in several embodiments below. In one embodiment of the invention, the graphical representation of the core data sources and relationships occurs in a general GUI rendering of graphical relationship(s) between data source tables in a data source relationship panel 258.

The next operation of FIG. 2B is to accept definition of relationships between the selected data source table and previously selected data source tables 256. In an embodiment, if the selected data source table is a non-core source table, it may have a relationship comprising an equality predicate defined between the selected non-core data source table, and a previously selected core data source table either directly, or through one or more other non-core tables which may be related to a core table. In one embodiment, the appearance of the graphical representation of a non-core data source table in a data source relationship panel may provide information about the relationship of the non-core data source to one or more core data source tables, such that the graphical representation of a non-core table that has a defined relationship with a core table (either directly, or through one or more other non-core tables which are related to a core table) appears distinct from the graphical representation of a non-core table that does not have a defined relationship with a core table. If there are no previously selected data source tables, then the process may proceed directly to the next operation.

The next operation of FIG. 2B is to graphically represent relationships between the selected data source table and previously selected data source tables in the data source relationship panel. In one embodiment, each relationship between data source tables may be graphically represented individually in the data source relationship panel. Further, each relationship between data source tables may be graphically represented.

The next operation of FIG. 2B is to determine whether there are any more data source tables which have been selected 260. If yes, the process returns to operation 250, and if no, the process is completed.

As described above in reference to the process of FIG. 2A, individual operations of the process of FIG. 2B may be conducted by a user. In particular, selection and mapping of data source tables in operations 250 and 252, and definition of relationships in operation 256 may be conducted by a user.

Figure 3:
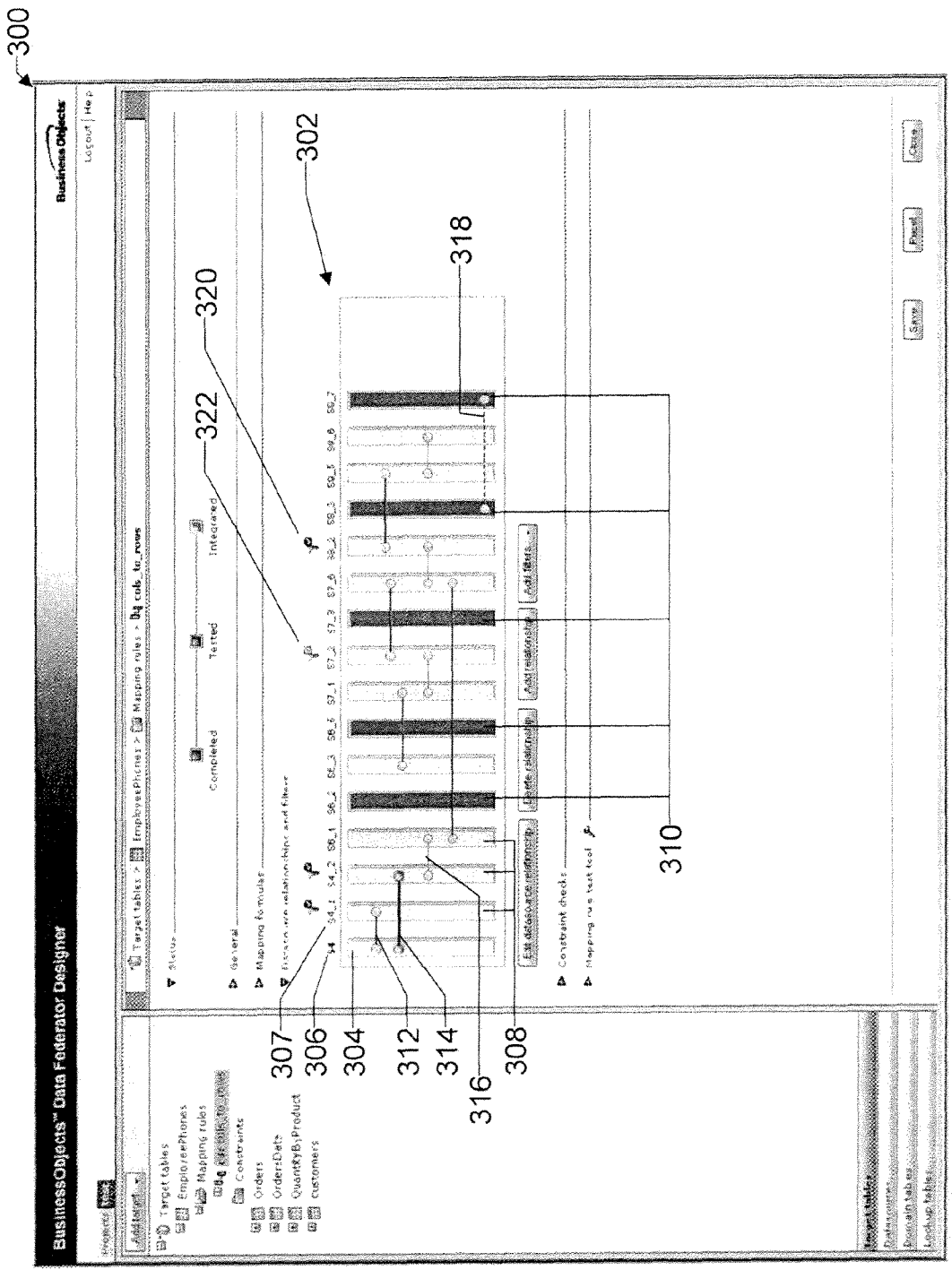
FIG. 3 illustrates a graphical user interface (GUI) configured in accordance with an embodiment of the invention.

FIG. 3 illustrates a graphical user interface (GUI) 300 that could be provided in a window displayed on an output device 104 of computer 100. The GUI 300 includes a data source relationship panel 302. The data source relationship panel 302 is used to graphically represent information about data source tables, relationships between data source tables, and optionally, data filters, according to an embodiment of the invention. Core data source table 304 appears in data source relationship panel 302 as a rectangle, and is identified by core data source table label 306. Non-core data source tables 308 and 310 appear in panel 302 as similar rectangles, and are identified by non-core data source table labels 307. In an embodiment of the invention, core and non-core data table labels 306 and 307, respectively, may have different appearances (such as the bold vs. non-bold fonts shown in panel 302 to distinguish between core and non-core data source tables). In one embodiment, the core tables are represented on the left hand side of the data source relationship panel in order to facilitate visualizing key connections among the data sources and to more easily graphically represent the significance of different links between the core and non-core tables. In the exemplary panel 302, data source tables are generally represented as vertically spaced rectangles, however data source tables, relationships, filters and other components of the invention shown in panel 302 may be optionally configured in many other orientations and appearances.

Non-core data source tables 308 are related directly or indirectly to core data source table 304 as shown in panel 302 by relationships 312, 314 and 316 which are represented by a solid relationship line between the related data source tables. Non-core data source tables 310 are not related to core data source table 304, and are therefore represented in a visually distinct manner (such as different shading of table representation rectangles 310) in panel 302. In this manner, a user can determine visually which non-core data source tables do not have a defined relationship directly or indirectly, to a core data source table.

Filter 320 is shown adjacent to a non-core data source table in panel 302, indicating that a data filter is defined for that corresponding data source table. Similarly, filter 322 is shown adjacent to another non-core data source table, indicating that a data filter is defined for that corresponding data source table. However, the difference in appearance between filter 320 and 322 represents the difference between a valid data filter definition in the case of filter 320, and an invalid data filter definition in the case of filter 322. In this manner a user can visually determine which data filters have valid definitions, and which do not. In an embodiment of the invention, a filter validity process may be implemented to determine whether the definition of a data filter is valid or invalid, based on one or more determining factors such as the syntactical accuracy of the filter logical definition relative to the source data table to which the filter applies. Other factors may be defined to determine the validity of a data filter definition, which may then be displayed visually by appearance of a data filter representation in panel 302.

Similarly, relationship line 318 is shown as a broken line, representing an invalid data source table relationship. In an embodiment of the invention, a relationship validity process may be implemented to determine whether the definition of a data source table relationship is valid or invalid, based on one or more determining factors such as the syntactical operability of the relationship definition. An invalid relationship definition may be caused by a change in one of the data source tables in the relationship definition, or a change in the data type of the data being linked. An invalid relationship, such as relationship 318 may be shown in panel 302 distinct in appearance from a valid relationship to visually alert a user to the invalidity of the relationship. A variety of factors may be defined to determine the validity of a relationship definition.

Figure 4:
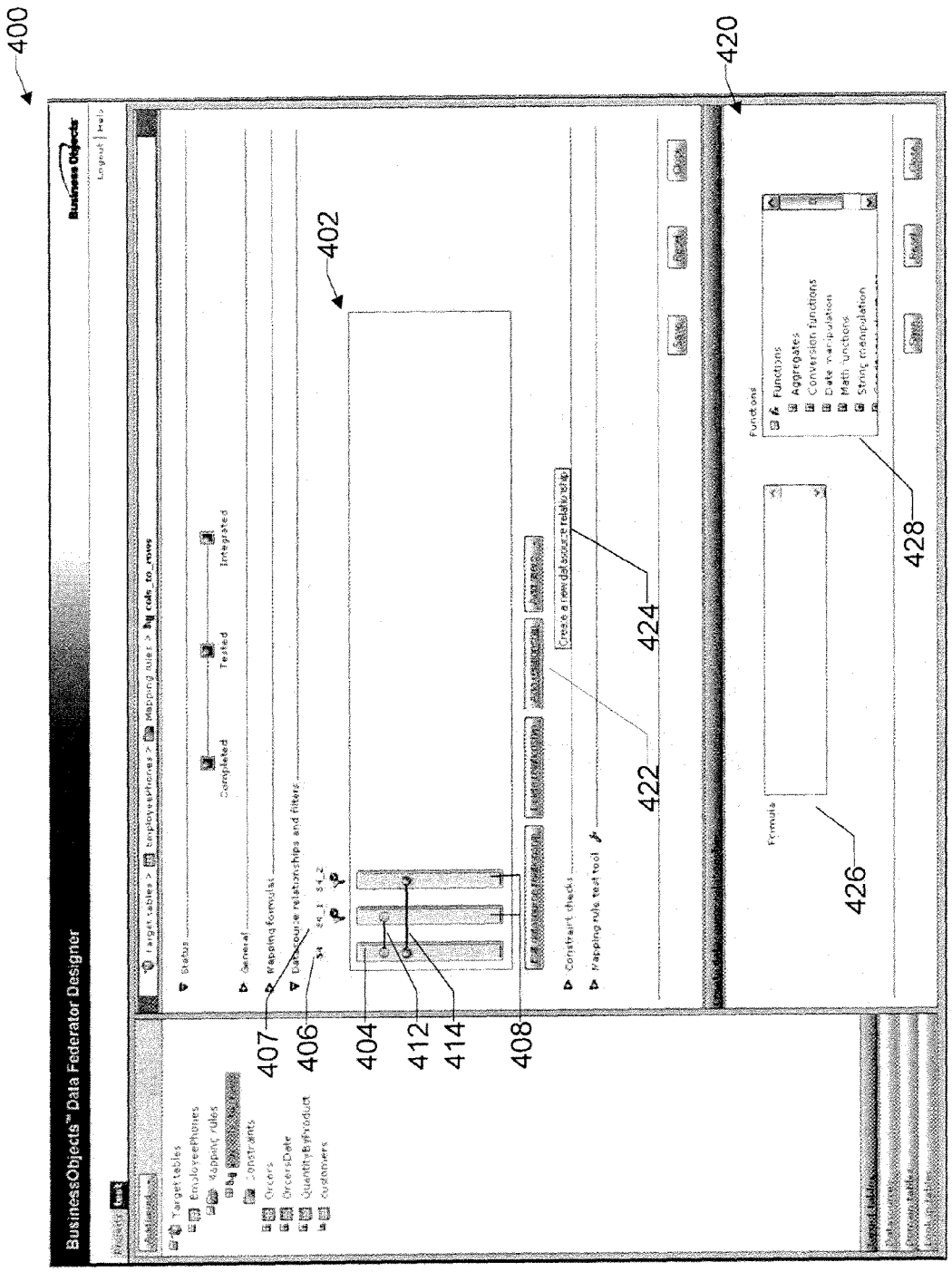
FIG. 4 illustrates a graphical user interface (GUI) configured in accordance with an embodiment of the invention

FIG. 4 illustrates a graphical user interface (GUI) 400 that includes a data source relationship panel 402, which generally corresponds to panel 302 in FIG. 3. Similarly, core data source table 404, non-core data source tables 408, data source table relationships 412 and 414, and core and non-core data source table labels 406 and 407 are analogous to corresponding features of panel 302 in GUI 300.

In another embodiment of the invention, post-processing data filters may be implemented that function to apply a data filter logical condition after column mapping formulas, and/or data source table relationships. Such post-type data filters may also be defined to apply one or more logical conditions to more than one data source table.

FIG. 4 additionally comprises source table relationship definition panel 420, comprising relationship formula window 426 and relationship function window 428, which may be activated by clicking on Add relationship button 422. Relationship definition panel 420 may be used to define a relationship between data source tables, such as by inputting a relationship formula (like an equality predicate statement) in formula window 426, or by selecting a relationship function from a list in relationship function window 428. FIG. 4 further illustrates a mouse-over tool-tip 424 identifying the functionality of Add relationship button 422 when a user positions a cursor over button 422. Other mouse-over tool-tips may be implemented to present information in panel 402 such as identities of data source tables, definitions or other information about filters or relationships, or a list of other data source tables to which a particular data source table is linked.

Figure 5:
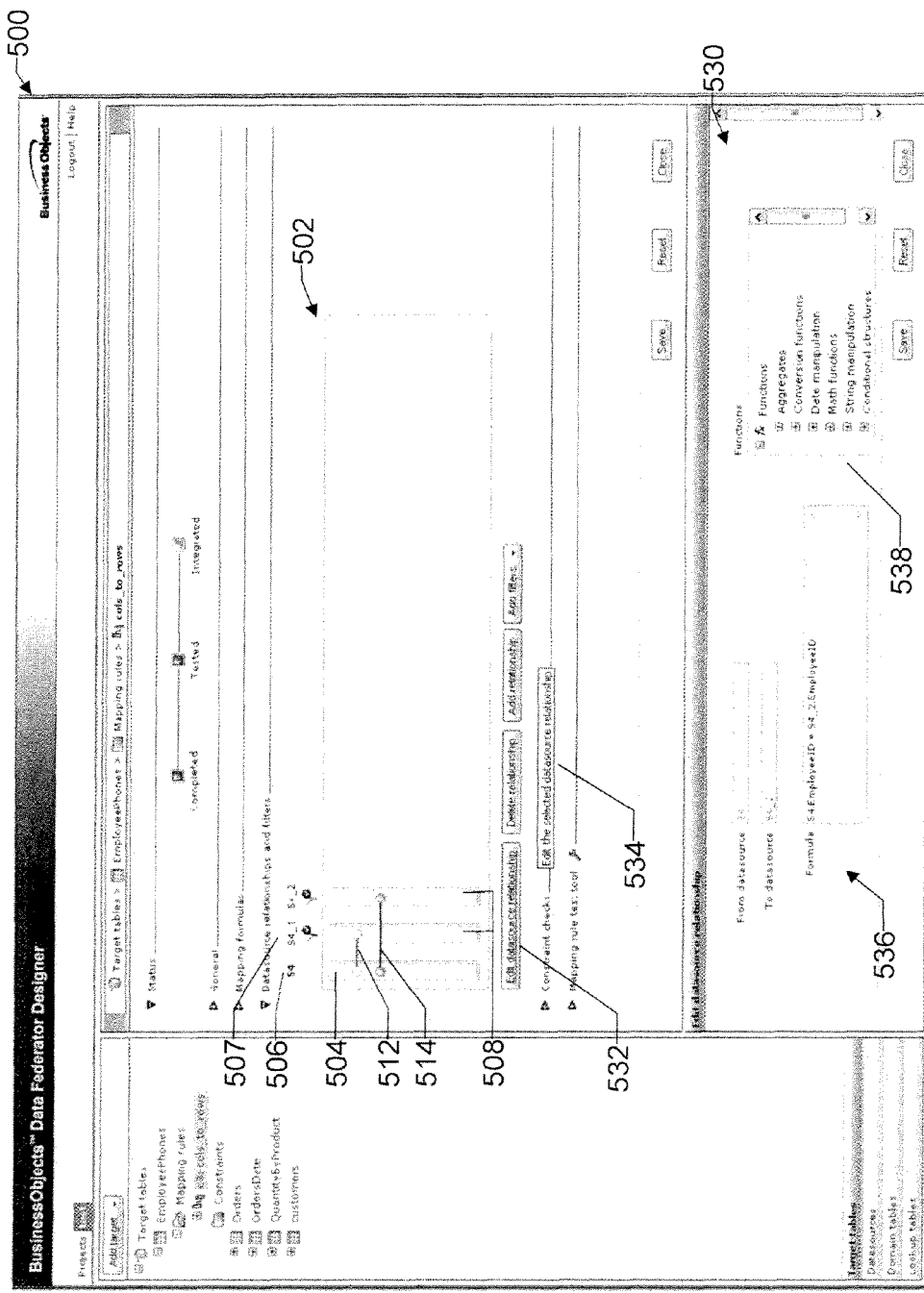
FIG. 5 illustrates a graphical user interface (GUI) configured in accordance with an embodiment of the invention.

FIG. 5 illustrates a graphical user interface (GUI) 500 that includes a data source relationship panel 502, which generally corresponds to panel 302 in FIG. 3. Similarly, core data source table 504, non-core data source tables 508, data source table relationships 512 and 514, and core and non-core data source table labels 506 and 507 are analogous to corresponding features of panel 302 in GUI 300.

FIG. 5 additionally comprises source table relationship editing panel 530, comprising relationship formula and source table windows 536 and relationship function window 538, which may be activated by clicking on Edit data source relationship button 532. Relationship definition panel 530 may be used to edit an existing defined relationship between data source tables, such as by inputting revised relationship formula or source table labels in windows 536, or by selecting a revised relationship function from a list in relationship function window 538. FIG. 5 further illustrates a mouse-over tool-tip 534 identifying the functionality of Edit data source relationship button 532 when a user positions a cursor over button 532.

Figure 6:
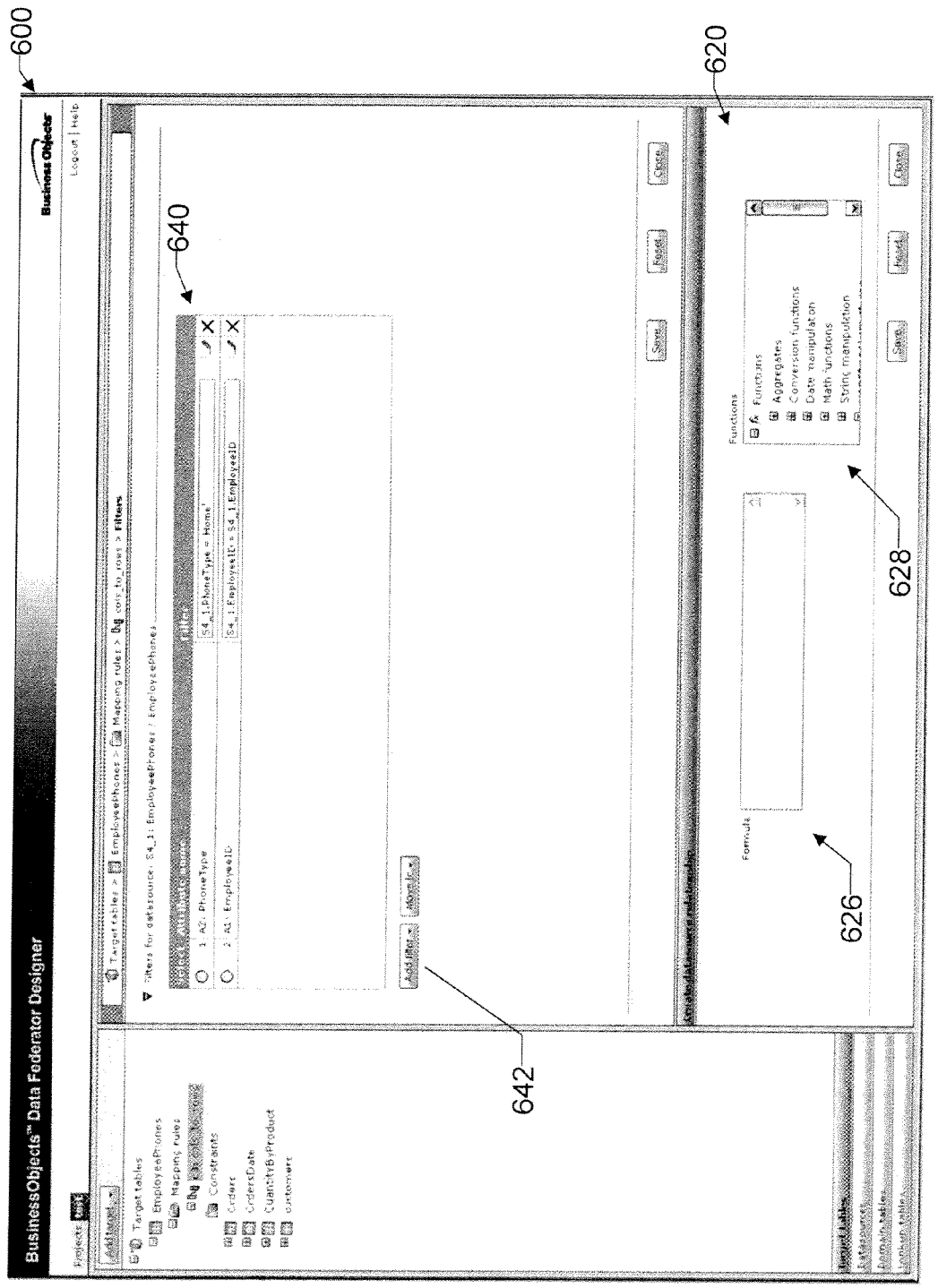
FIG. 6 illustrates a graphical user interface (GUI) configured in accordance with an embodiment of the invention.

FIG. 6 illustrates a graphical user interface (GUI) 600 that includes a data filter definition panel 640 activated by Add filter button 642. A new data filter may be defined by using data filter definition panel 640, such as by inputting a data source table to apply a filter to, and a filter logical condition to apply to the data source table.

FIG. 6 also includes a source table relationship definition panel 620, comprising relationship formula window 626 and relationship function window 628, similar to those described above in FIG. 4.

Figure 7:
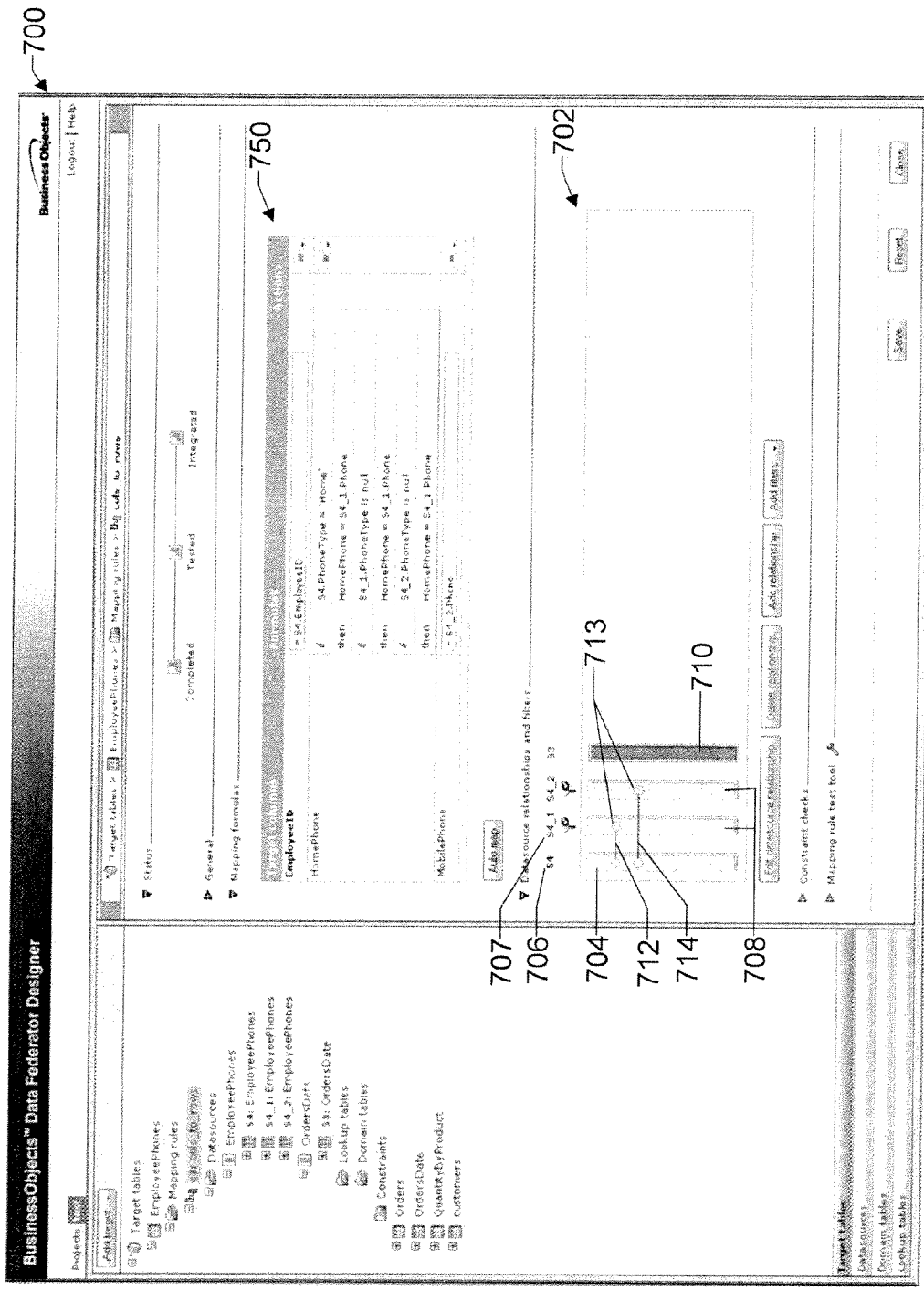
FIG. 7 illustrates a graphical user interface (GUI) configured in accordance with an embodiment of the invention.

FIG. 7 illustrates a graphical user interface (GUI) 700 that includes a data source relationship panel 702, which generally corresponds to panel 302 in FIG. 3. Similarly, core data source table 704, non-core data source tables 708, data source table relationships 712 and 714, and core and non-core data source table labels 706 and 707 are analogous to corresponding features of panel 302 in GUI 300. Panel 702 also shows non-core data source table 710 which does not have a relationship defined with core data source table 704, and is therefore displaced visually distinctly from non-core data source tables 708, which do have a relationship (direct or indirect) defined with core data source table 704. Panel 702 further shows relationship line endpoints 713, which are situated at the ends of relationship lines 712 and 714, and which provide distinct identification of the data source tables to which relationships 712 and 714 relate. Mapping formula panel 750 provides a means to view and edit formulas associated with target columns.

Figure 8:
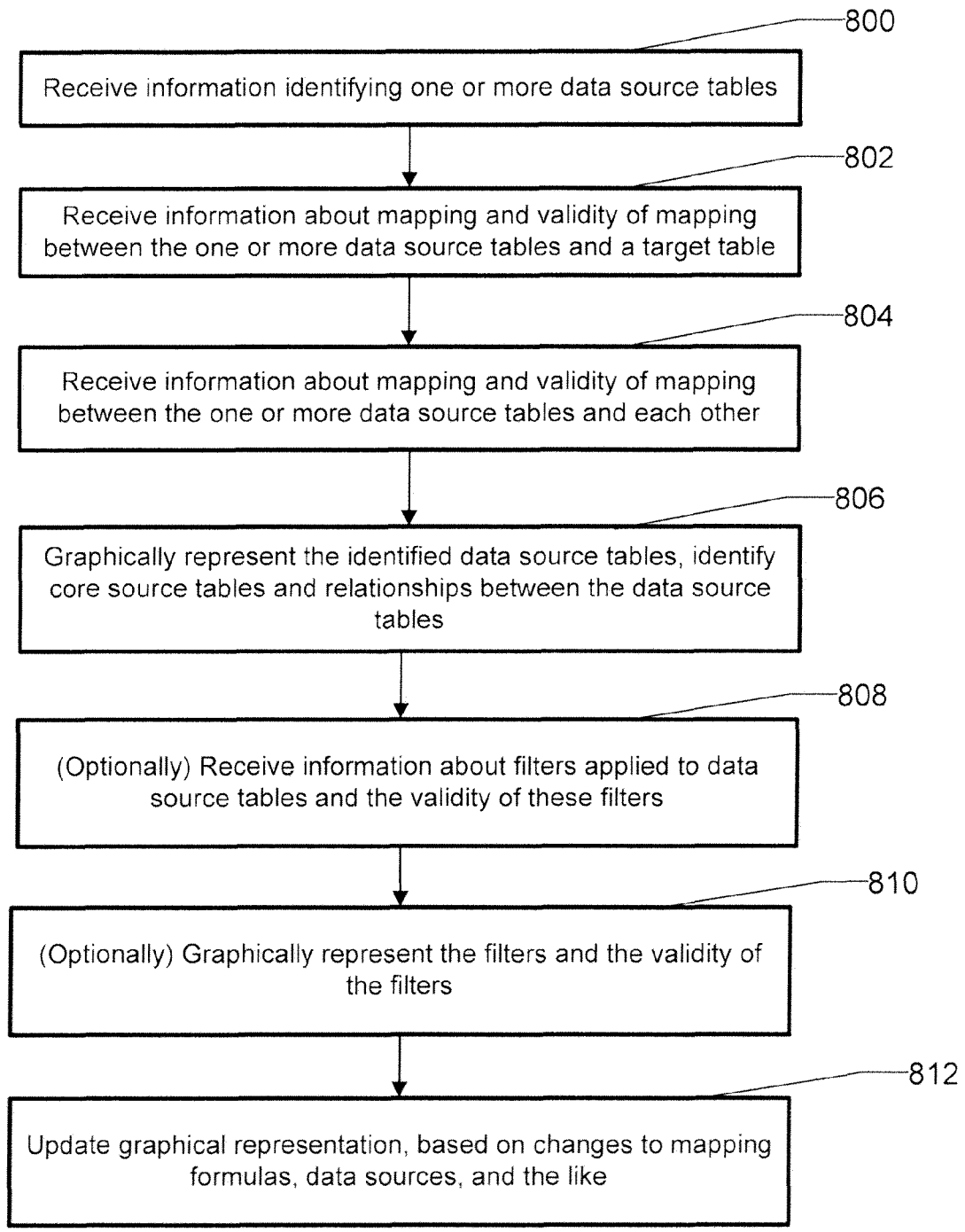
FIG. 8 illustrates processing operations associated with an embodiment or the invention.

FIG. 8 illustrates a workflow associated with receiving information about a data source, validating the information and then displaying it graphically in an embodiment of the invention. Information is received identifying one or more data source tables 800. Information is received about mapping and the validity of mapping between the one or more data source tables and a target table 802. This information comes from mapping formulas, mapping information includes, whether or not there is a link, and if there is a link whether it is valid. Information about mapping and the validity of the mapping between one or more of the data source tables and each other is received 804. Based on this information, a graphical representation of the identified source tables, core tables, and relationships between the source tables are displayed 806. In a preferred embodiment, the order in which the graphical representations of the tables are displayed is based on displaying representations in this order: first core data sources that connect to a target, second core data sources that connect other core data sources, and then non-core source data source tables ordered based on the depth of the link from the furthest non-core table to a core table. FIG. 8 also illustrates an optional operation of receiving filter information 808, and an optional operation to graphically represent the filters 810. An optional operation to update a graphical representation based on changes to mapping formulas, data sources, and the like 812 reflects an embodiment of the invention where the data source relationship panel automatically updates to reflect any changes that directly or indirectly alter the underlying data and relationships that the panel represents.

Figure 9:
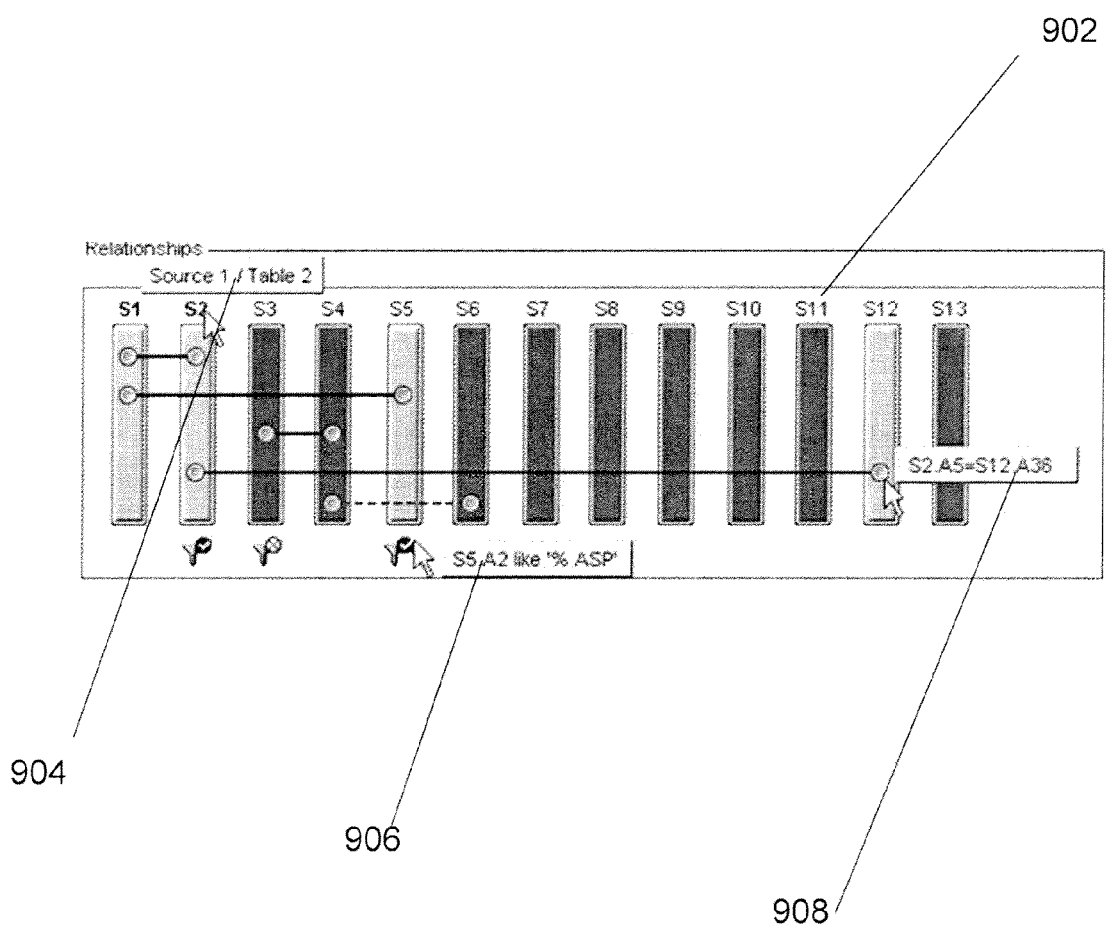
FIG. 9 illustrates a graphical user interface (GUI) configured in accordance with an embodiment of the invention

FIG. 9 illustrates a GUI associated with an embodiment of the invention. A data source relationship panel 902 corresponds to panels 302, 402, 502, and 702. On panel 902, mouse-over tool-tips are displayed to provide further data about the data sources 904, filters and data source relationships. A data source mouse-over tool-tip 906 provides specific details about the source and table represented by the column. A data source relationship tool-tip 908 provides information about the specific relationship, such as in this case that column A5 from source 2 is being linked to column A36 in source 12. In this example, column names have aliases, but these could be column names such as customer, product, etc. This provides the user with the ability to view more granular aspects of the relationships. The level of granularity of the information displayed in the mouse-over tool-tip may vary in different implementations.

Figure 10:
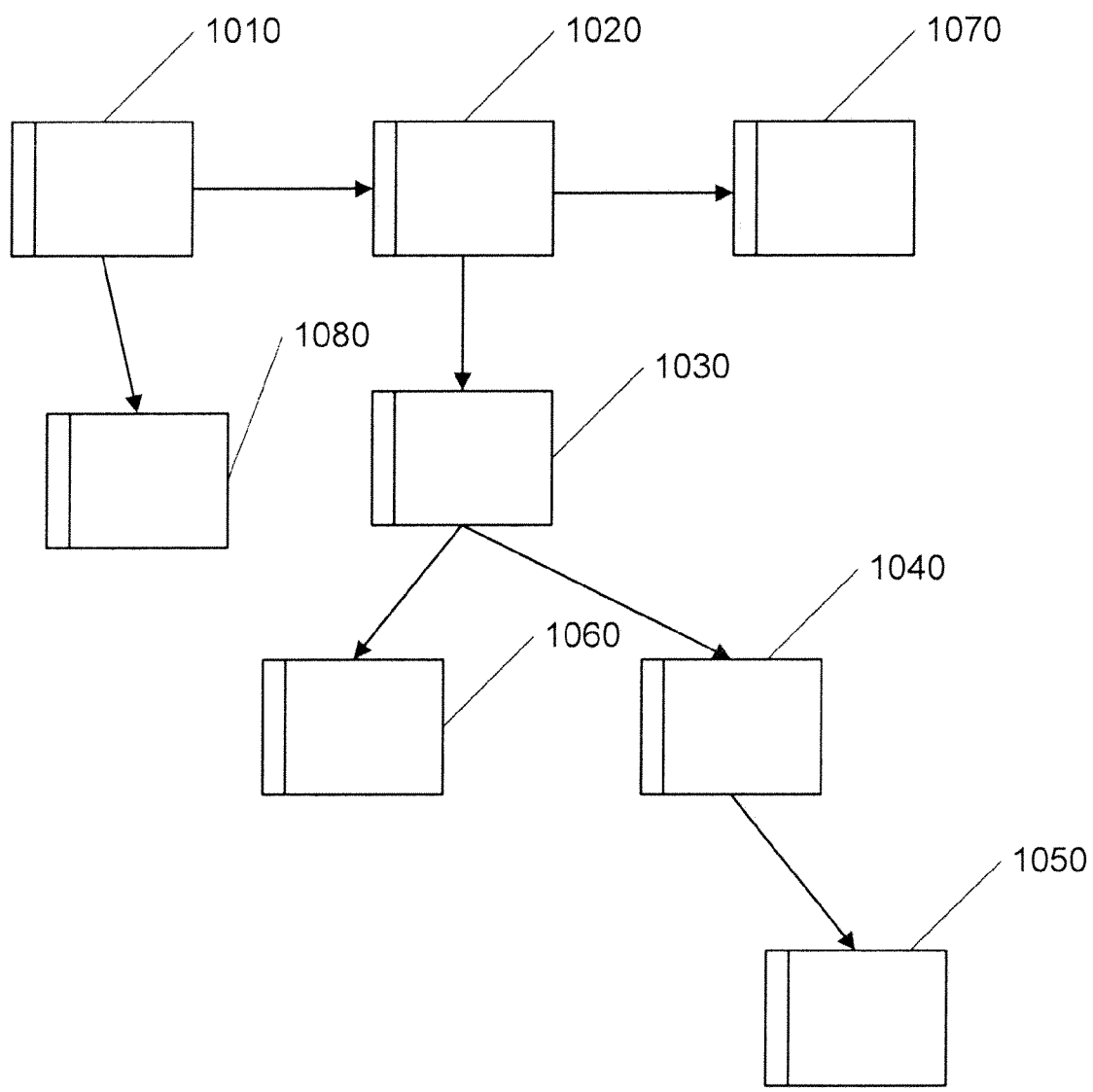
FIG. 10 illustrates table relationships established in accordance with an embodiment of the invention.

FIG. 10 illustrates a link structure between data sources where 1010 is a core source data source table and the other tables are non-core. From this figure one can trace the depth of the relationship paths from 1010 to the various terminal linked tables in the structure, with the path from 1010 to 1050 being the longest path, followed by the paths to 1060 and 1070, and the path to 1080 being the shortest. This calculation of depth may determine the logical order in which the data sources are displayed in the data source relationship panel.

Figure 11:
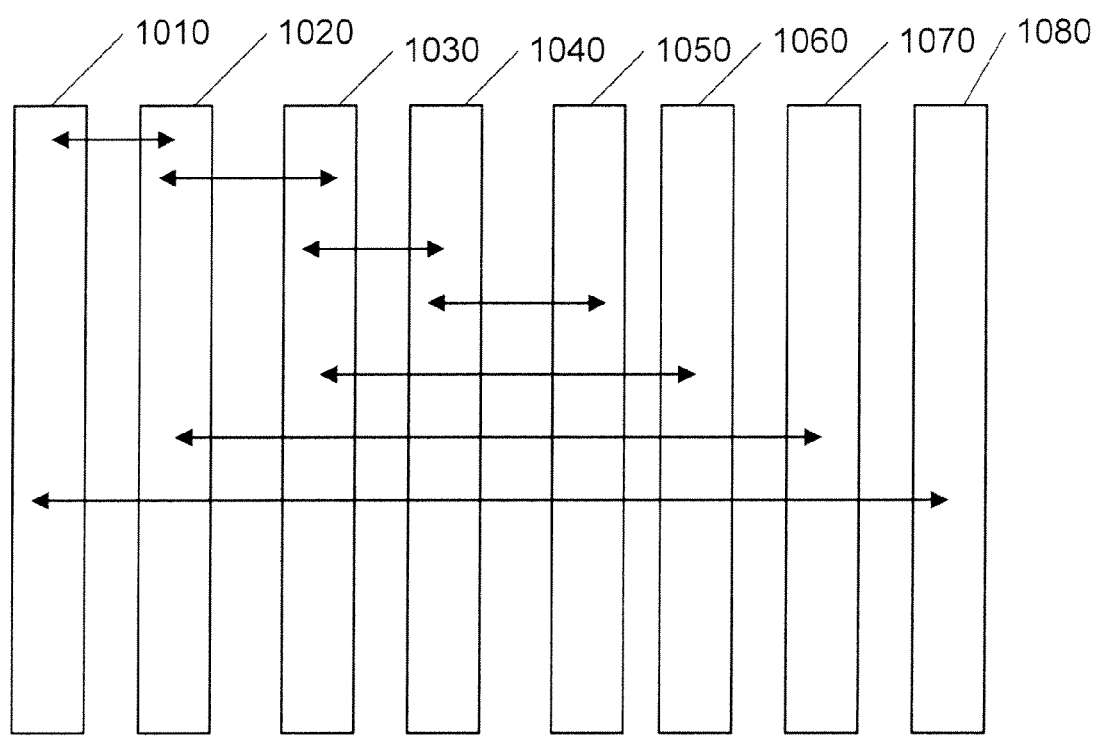
FIG. 11 illustrates table path relationships displayed in accordance with an embodiment of the invention.

FIG. 11 illustrates the same data structure as illustrated in FIG. 10 with like source data source tables having corresponding numbering. By ordering based on depth, the visualization enables the user to easily scan the connection through the data sources with the most links that might be broken and scan dependencies. In this example, the user can easily visualize that breaking a link between data source table 1020 and 1030 would have the most significant consequences in terms of breaking the relationships in the data structure and having broken relationships between the core source data source table 1010 and the other data source tables.

Figure 12:
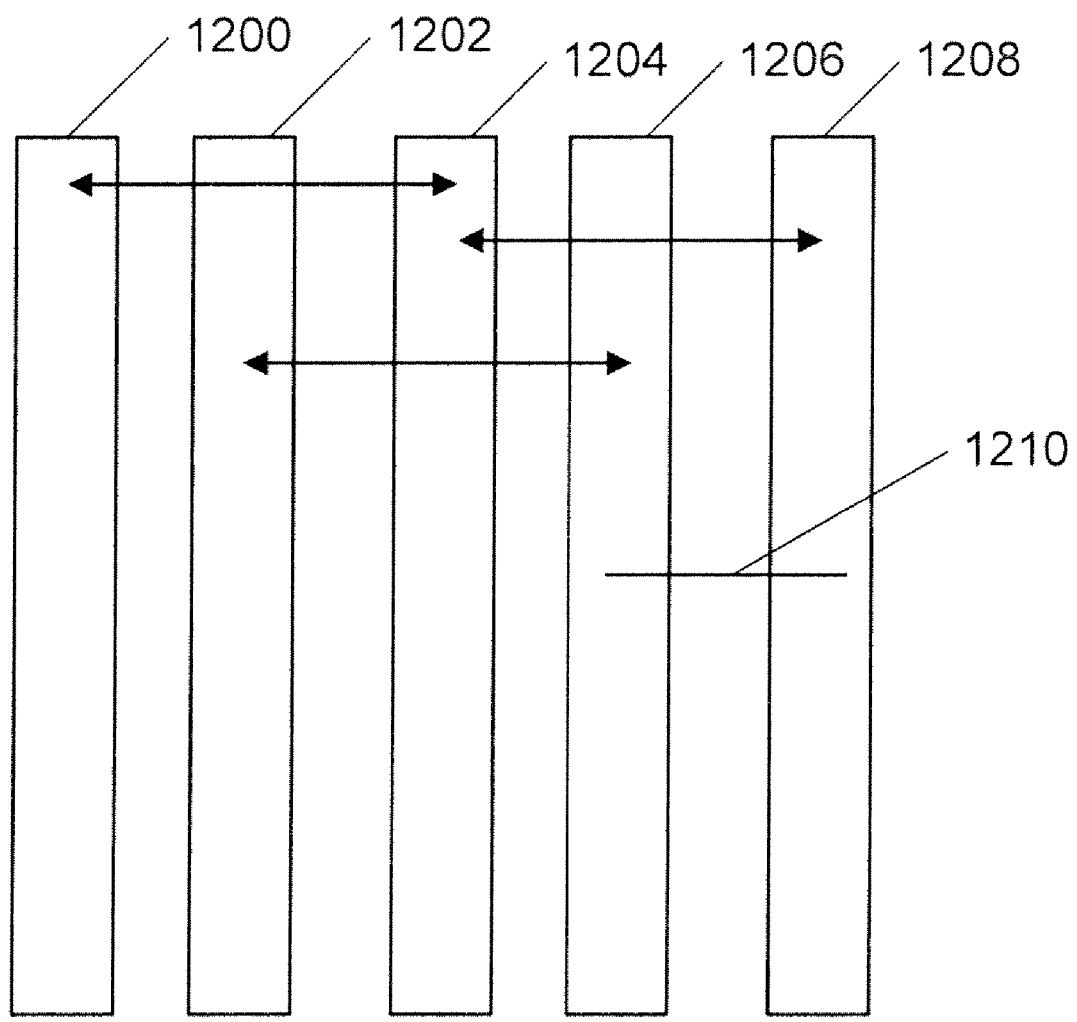
FIG. 12 illustrates various table path relationships displayed in accordance with an embodiment of the invention.

FIG. 12 illustrates a configuration where the set of data sources are not fully linked, data source table 1202 and 1206 would be highlighted to indicate that they are not connected to the core data source table 1200. Although 1202 and 1206 are linked together, they are not linked to the rest of the data source tables and have no link to the core source data source table 1200. Using the visualization, it becomes apparent that adding a new link 1210 between 1208 and 1206 would connect these data sources to the core data source table 1200.

Figure 13:
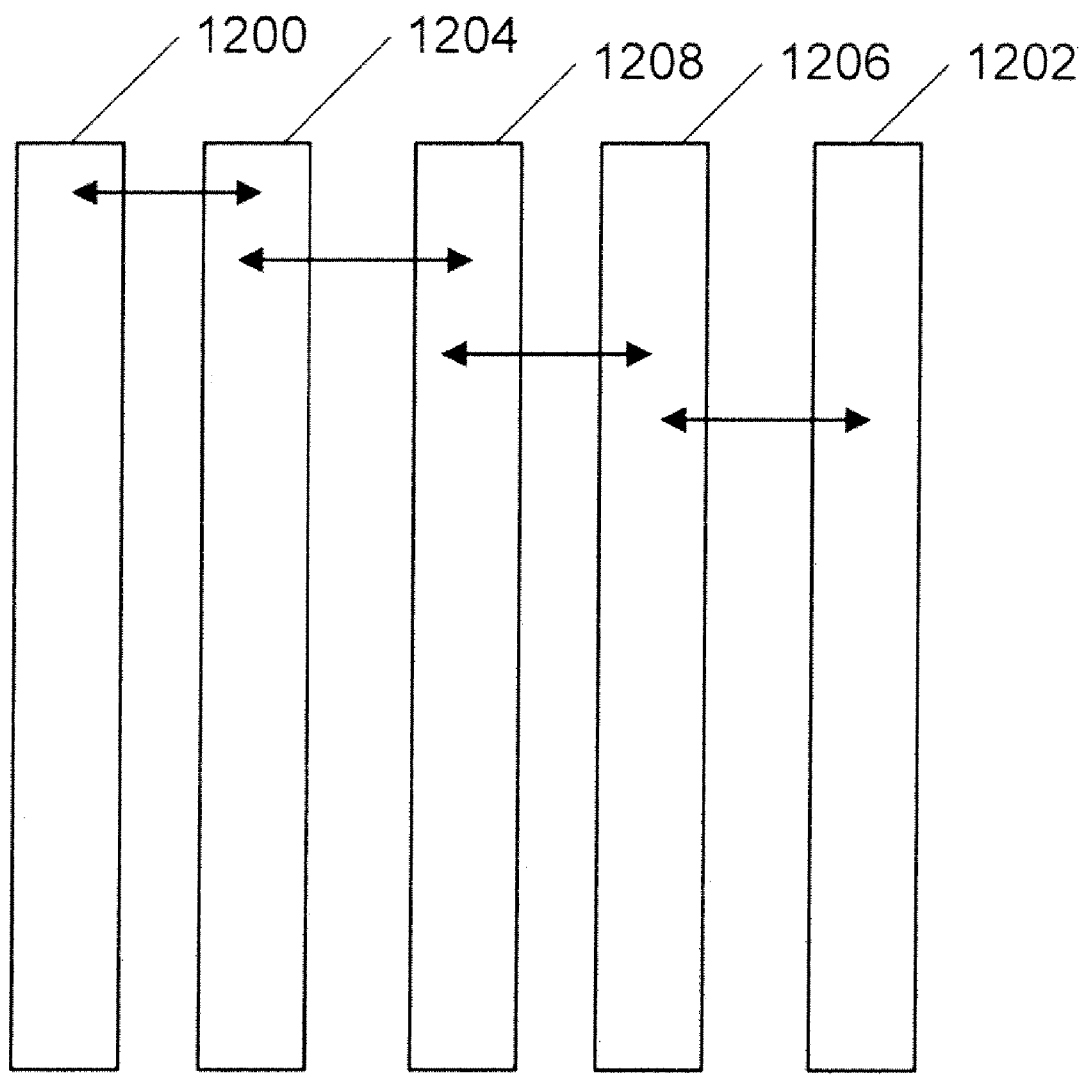
FIG. 13 illustrates table path relationships displayed in accordance with an embodiment of the invention.

FIG. 13 illustrates the effect of adding link 1210 in FIG. 12. By linking 1204 and 1208, the structure of the longest path through linked source tables changes. In response to this change, the visualization is updated to reflect the new longest path from the core source table. The order of the source tables changes to make the link structure more easily understood.

Figure 14:
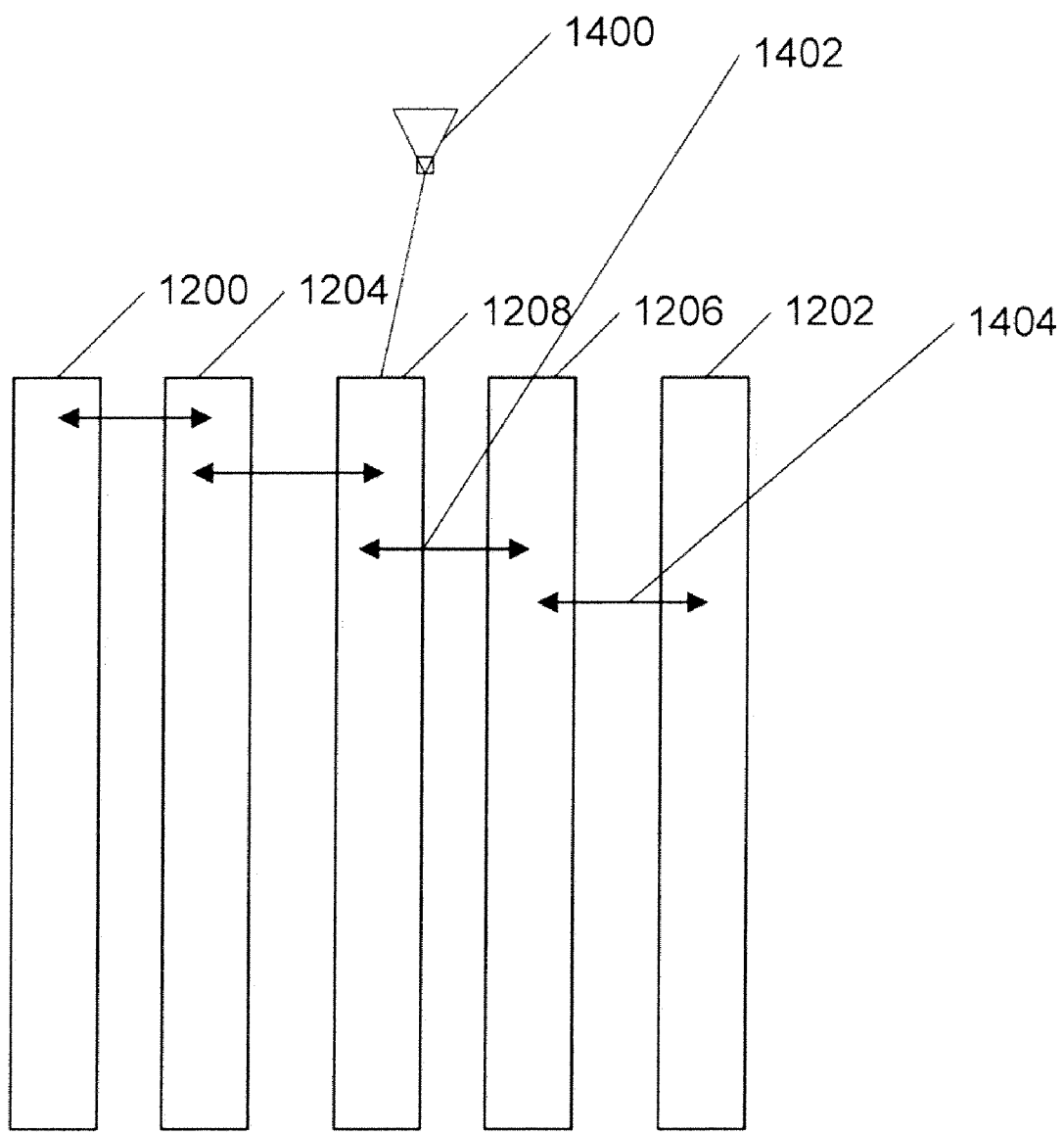
FIG. 14 illustrates the application of a filter in accordance with an embodiment of the invention.

FIG. 14 illustrates the significance of showing a filter and how this leverages the easy to understand relationships between the source tables in the visualization. In this example, a filter is added to source table 1208. For example, in FIG. 14 data source table 1208 could be filtered to contain only data from Country US. Source data from tables linked to this filter will be affected in so much as data that would have been linked if the filter had not been applied will not be linked to 1208. If the country filter is applied to 1208 and after the filter point in 1206 or 1202 there is data for France and Germany, that data will no longer be linked because of the filter. In this way, using a layout based on the deepest path also facilitates understanding the impact of filters.

Figure 15:
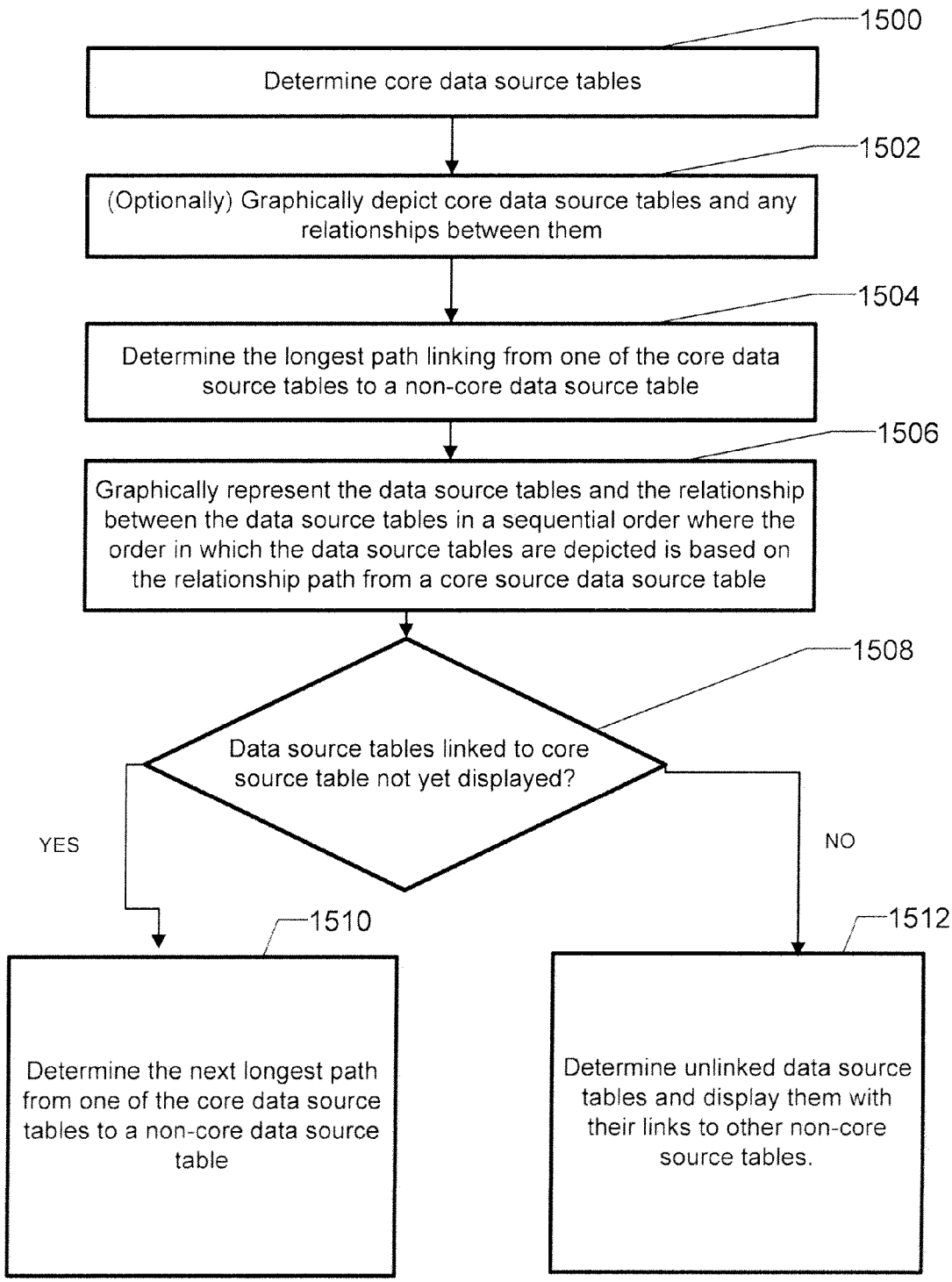
FIG. 15 illustrates processing operations associated with evaluating relationships in an embodiment of the invention.

FIG. 15 illustrates processing associated with another embodiment of the invention. Core data source tables are determined 1500. Optionally, the core data source tables and any relationships between them are graphically depicted 1502. Alternatively, the core source data source tables and any relationships between them can be first rendered in operation 1506 with the other data source tables. The longest path linking from one of the core data source tables to a non-core data source table is identified 1504. An updated graphical representation of the data source tables and the relationship between the data source tables in a sequential order where the order in which the data source tables are depicted is based on the relationship path from a core source data source table graphical depiction is then provided 1506. If source tables that are linked to a core source table are not yet displayed (Block 1508—Yes), then determine the next longest path 1510. Otherwise, (Block 1508—No) determine the unlinked source table 1512.

Figure 16:
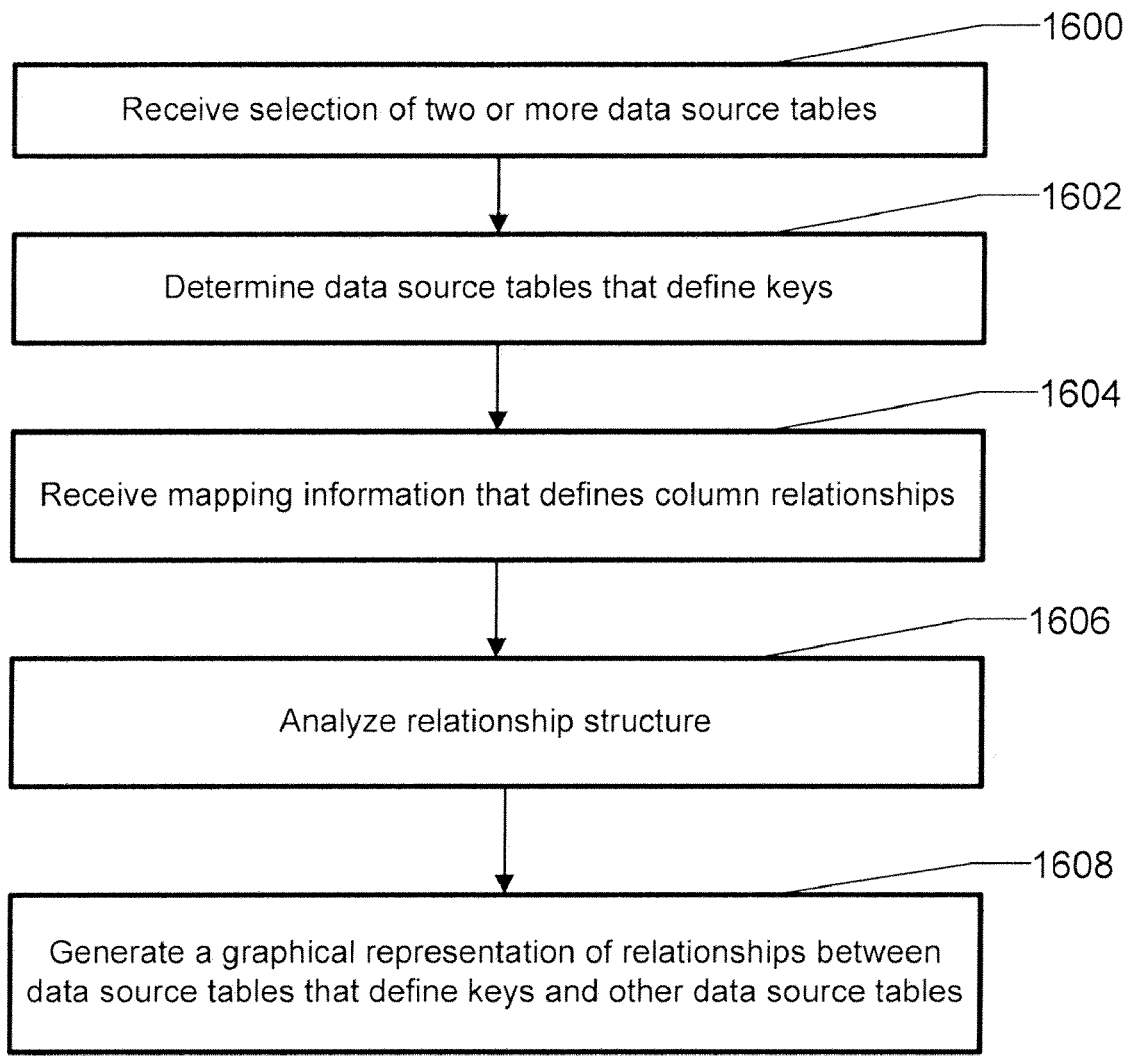
FIG. 16 illustrates general processing operations associated an embodiment of the invention.

FIG. 16 illustrates processing associated with another embodiment of the invention. Receive a selection of two or more data source tables 1600 provides two or more data source tables that may or may not be related. Operation 1602 defines the data source tables that define keys either primary or foreign keys. Receive mapping information that defines column relationships 1604 provides information about how columns are mapped. Analyze relationship structure 1606 analyzes the relationships between the tables. The analysis includes evaluating direct and indirect links, evaluating the depth of links, evaluating tables that are not linked with other tables, evaluating tables that are not linked with tables that define keys, and the like. Generate a graphical representation of relationships between data source tables that define keys and other data source tables 1608 generates a graphical representation of the source tables and their links.

In one embodiment, the graphical representation is structured to first display tables that define keys at one side of the panel. Next, tables are depicted based on initially depicting the tables in the deepest relationship to a table defining a key. The tables in the next deepest relationship are depicted, until finally depicting tables that are not linked to a table defining a key. When depicting the tables in a linked relationship based on a depth priority, the tables are depicted sequentially along the link path. In one embodiment, tables that are not linked to a table that defines keys are depicted in a different color than tables that are linked to a table defining a key. In one embodiment links are graphically depicted as lines between columns that represent data source tables.

In one embodiment, data target tables and data source tables such as those described above may be relational database tables. However, in other embodiments, data source tables may be text file tables, multidimensional database tables, hybrid-type database tables, or other suitable types of data tables.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium storing executable instructions to graphically represent one or more relationships between data source tables, the executable instructions executed by a processor to:
   receive a selection of multiple data source tables from one or more data sources used to populate a data warehouse;
   determine a data source table, from the selection of multiple data source tables, that defines keys;
   receive mapping information that defines one or more column relationships between the data source table and a second data source table from the selection of multiple data source tables;
   analyze relationship structures of the selection of multiple data source tables based on the mapping information;
   determine a longest path from the data source table to one of the selection of multiple data source tables; and
   graphically represent the selection of multiple data source tables and the relationship structures in a sequential order, where the sequential order in which the selection of multiple data source tables are depicted is based on the longest path, thereby creating a visualization of dependencies between the multiple data source tables that supply data to the data warehouse.

2. The computer readable storage medium of claim 1 wherein the executable instructions to determine a data source table that defines keys further comprises executable instructions to evaluate a data source table in relationship to a target table.

3. The computer readable storage medium of claim 1 wherein graphically representing the data source tables and the relationship structures further comprises executable instructions to generate the order in which data source tables are depicted based on depicting a first set of data source tables sequentially in a first deepest relationship path, and sequentially ordering a second set of data source tables in a second deepest relationship path.

4. The computer readable storage medium of claim 3 wherein the executable instructions to generate the order in which data source tables are depicted further comprises executable instructions to include data source tables that are not linked after depicting the linked data source tables.

5. The computer readable storage medium of claim 1 further comprising executable instructions to apply a filter between the data source table and the second data source table.

6. The computer readable storage medium of claim 1 further comprising executable instructions to graphically differentiate core and non-core data source tables.

7. The computer readable storage medium of claim 1 further comprising executable instructions to graphically display links with a core table.

8. The computer readable storage medium of claim 1 further comprising executable instructions to associate a tool tip with a graphically displayed relationship.

9. A computer readable storage medium storing executable instructions to graphically represent one or more relationships between data source tables, the executable instructions executed by a processor to:
   receive a selection of multiple data source tables from one or more data sources;
   map the multiple data source tables to a target table of a data warehouse;
   graphically represent the multiple data source tables;
   receive one or more definitions of a relationship between the multiple data source tables and secondary data source tables, wherein the secondary data source tables are from a previous selection;
   for each table in the multiple data source tables, determine a longest path from the table to one of the secondary data source tables;
   graphically represent the relationship between the multiple data source tables and the secondary data source tables in an order based upon the longest paths, thereby creating a visualization of dependencies between the multiple data source tables that supply data to the target table of the data warehouse.

10. The computer readable storage medium of claim 9 wherein the executable instructions to map include executable instructions to specify no relationship between the data source table and a target table.

11. The computer readable storage medium of claim 9 wherein the executable instructions to receive one or more definitions include executable instructions to specify no relationship.

12. The computer readable storage medium of claim 9 further comprising executable instructions to determine when the data source table is associated with a key in the target table.

13. The computer readable storage medium of claim 9 wherein the order in which data source tables are depicted is based on direct links with keys in target tables.

14. The computer readable storage medium of claim 9 further comprising executable instructions to apply a filter between a data source table and a second data source table.

15. The computer readable storage medium of claim 9 further comprising executable instructions to graphically differentiate core and non-core data source tables.

16. The computer readable storage medium of claim 9 further comprising executable instructions to graphically display links with a core table.

17. The computer readable storage medium of claim 9 further comprising executable instructions to associate a tool tip with a graphically displayed relationship.

18. The computer readable storage medium of claim 9 further comprising executable instructions to receive a change in relationship between data source tables and to update the graphical representation of the relationship to reflect the change.

19. The computer readable storage medium of claim 9 further comprising executable instructions to receive a deletion or insertion of a data source table and to update the graphical representation of the relationship to reflect the deletion or insertion.

20. The computer readable storage medium of claim 14 further comprising executable instructions to receive a change in a filter applied to a data source table and to update the graphical representation of the relationship to reflect the change in the filter.

* * * * *